INVENTOR.
DONALD DODKIN
CHARLES L. MACGREGOR
BY Louis L. Gagnon
ATTORNEY.

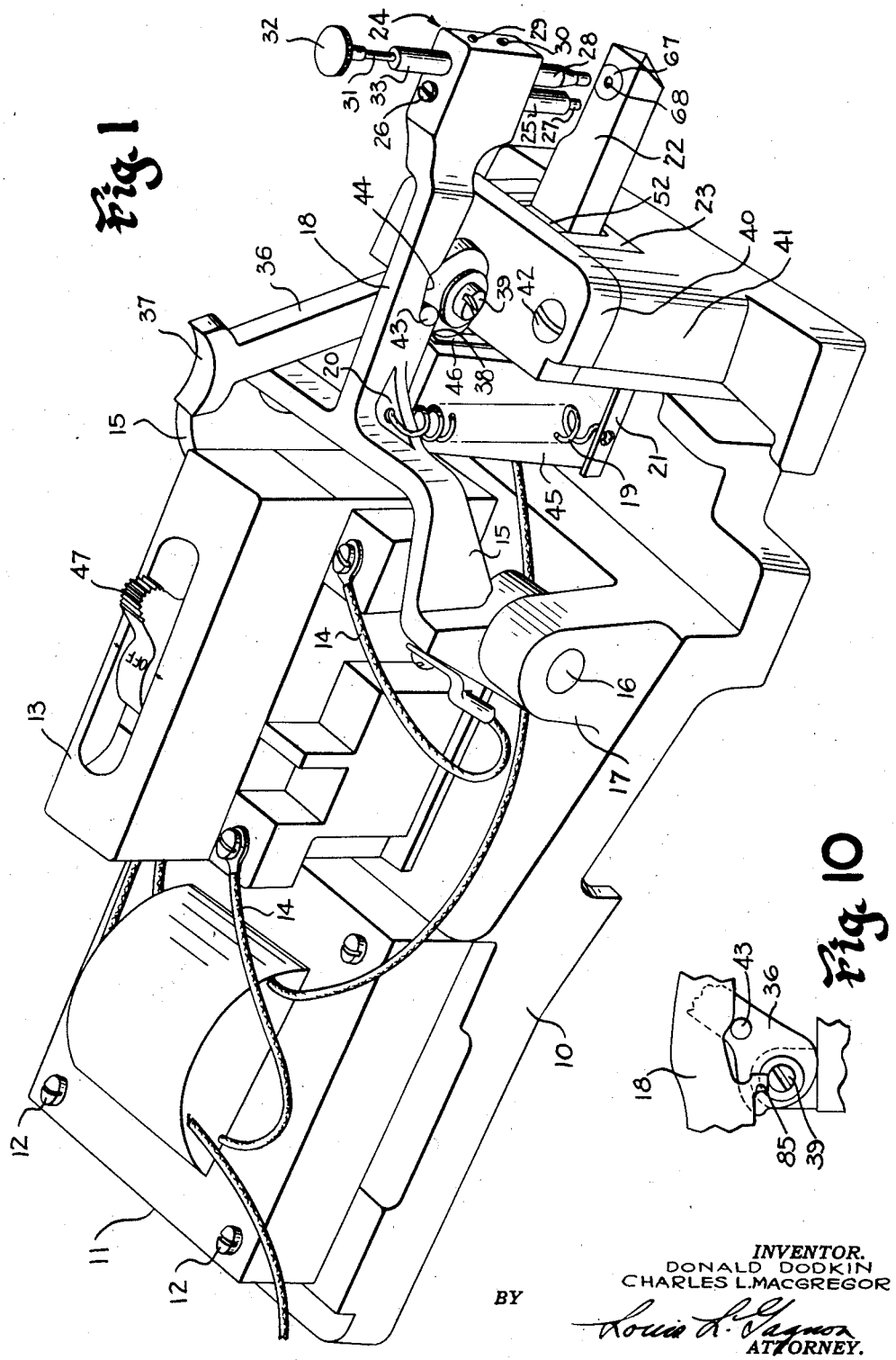

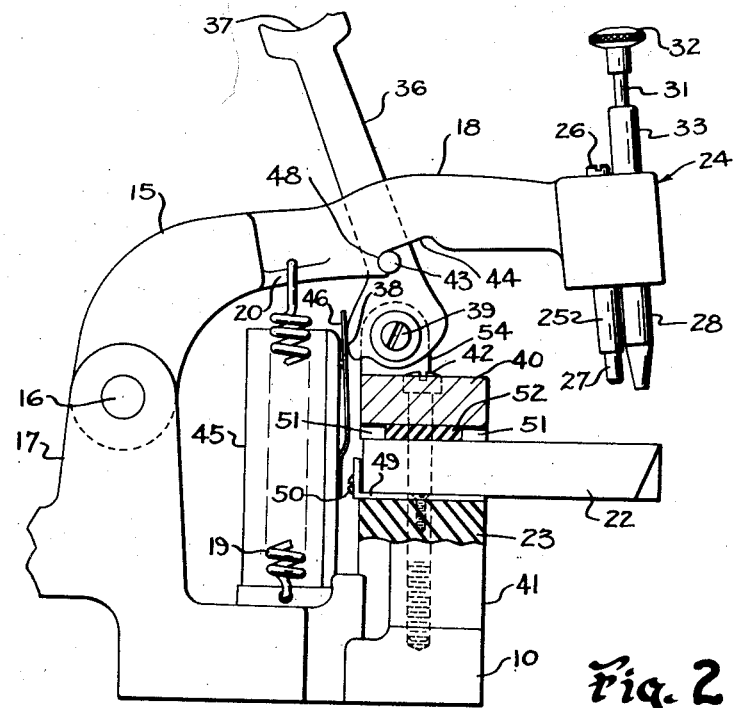
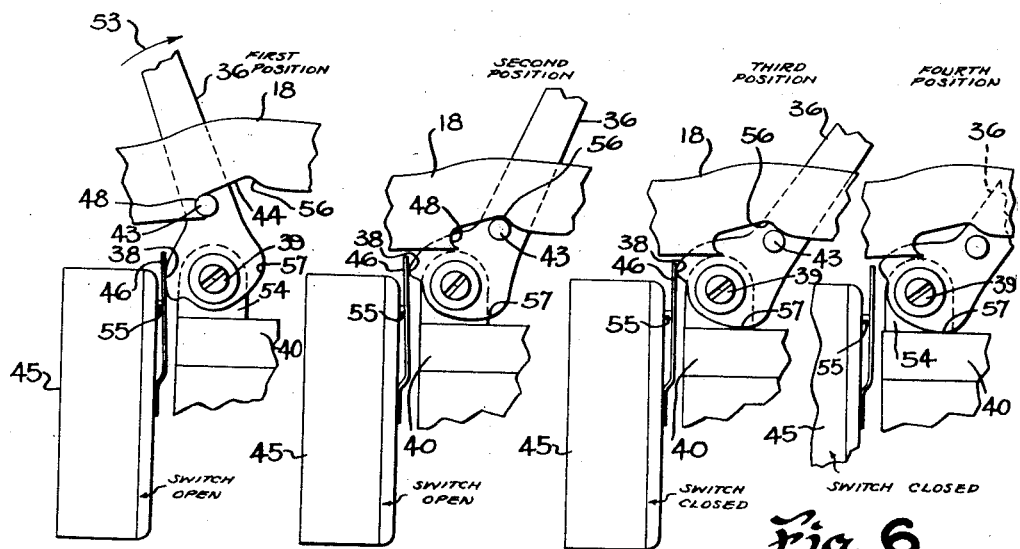

Patented June 8, 1943

2,321,368

UNITED STATES PATENT OFFICE 2,321,368

HEATING DEVICE FOR OPHTHALMIC MOUNTINGS

Donald Dodkin and Charles L. MacGregor, Southbridge, Mass., assignors to American Optical Company, Southbridge, Mass., a voluntary association of Massachusetts Application March 13, 1941, Serial No. 383,202

3 Claims. (Cl. 219—12)

This invention pertains to improvements in method and means for assembling ophthalmic mountings and has particular reference to improved means and method of integrally uniting and separating certain of operable and separable parts of such mountings.

A primary object of the invention is to provide improved means and method of integrally assembling and separating the operable and separable parts of an ophthalmic mounting by the application of heat.

A further object of the invention is to provide improved means in a device of the above character for controlling the amount of heat applied to the parts being united or separated.

Another object of the invention is to provide improved means and method of supporting the parts in suitable relation with each other during the heating thereof.

A further object is to provide a device of the class described wherein switching means are provided in the input and output portions of a transformer circuit exclusive of the heating electrodes per se.

A further object of the invention is to provide a soldering machine of the class described wherein a movement of a camming surface in a single given direction will cause the electrodes to move from an inoperative to an operative position and thereafter complete a circuit for energizing said electrodes.

A further object is to provide improvements in a device of the class described for securely uniting parts by application of heat wherein the electrode end is of such material and/or dimensions as to increase the temperature of the tip adjacent the parts to be securely connected by application of heat.

A further object of the invention is to provide an annular member so dimensioned and shaped as to provide means and method for facilitating dismounting certain of the ophthalmic mounting assembly.

A still further object is to provide improvements in camming means to insure proper contact of the assembled parts intermediate the electrodes before the heating energy is connected to the electrodes.

A still further object is to provide improvements in the electrical circuit and means for operating same to establish mechanical connections between the electrodes and the parts to be heated before the heating energy is connected to said electrodes.

A still further object is to provide improvements in a cam operated switching mechanism wherein a continuous movement of a cam will, through progressive steps, cause electrodes to move from an inoperative position to an operative position before the electrodes are energized for heating purposes and then energize the electrodes and permit the camming member to be moved to a stop position.

A still further object of invention is to provide improvements and means wherein the maximum and minimum operating electrode distance may be attained before the safety switch is operated.

Other objects and advantages will become apparent from the following description taken in connection with the accompanying drawings, and it will be apparent that many changes may be made in the details of construction, arrangement of parts, and steps in the process without departing from the spirit of the invention as expressed in the accompanying claims. The exact details shown and described are preferred forms only shown by way of illustration and are not to be considered as limitations.

Referring to the drawings:

Fig. 1 is a perspective view of the invention, with the cover removed, showing the arrangement of parts with the camming lever in an inoperative position.

Fig. 2 is a fragmentary side view, partly broken away, showing the master electrodes in relation to the camming lever and micro-switch holding means sectionalized.

Fig. 3 is a fragmentary side view of Fig. 2 showing the camming lever in its inoperative position with the micro-switch open.

Fig. 4 is a view substantially similar to Fig. 3 showing the position of the camming parts at a moment when the electrodes are engaging the parts to be heated while the micro-switch is still open.

Fig. 5 is a third position of the camming lever showing that continuous movement of the camming lever has closed the micro-switch.

Fig. 6 is a fourth step in the camming lever progression showing the camming lever moved to its fully operative position and engaging stop means while the micro-switch remains closed.

Fig. 10 is a modification of the stop means for preventing the movable electrode from engaging the stationary electrode.

Figures 7, 8:
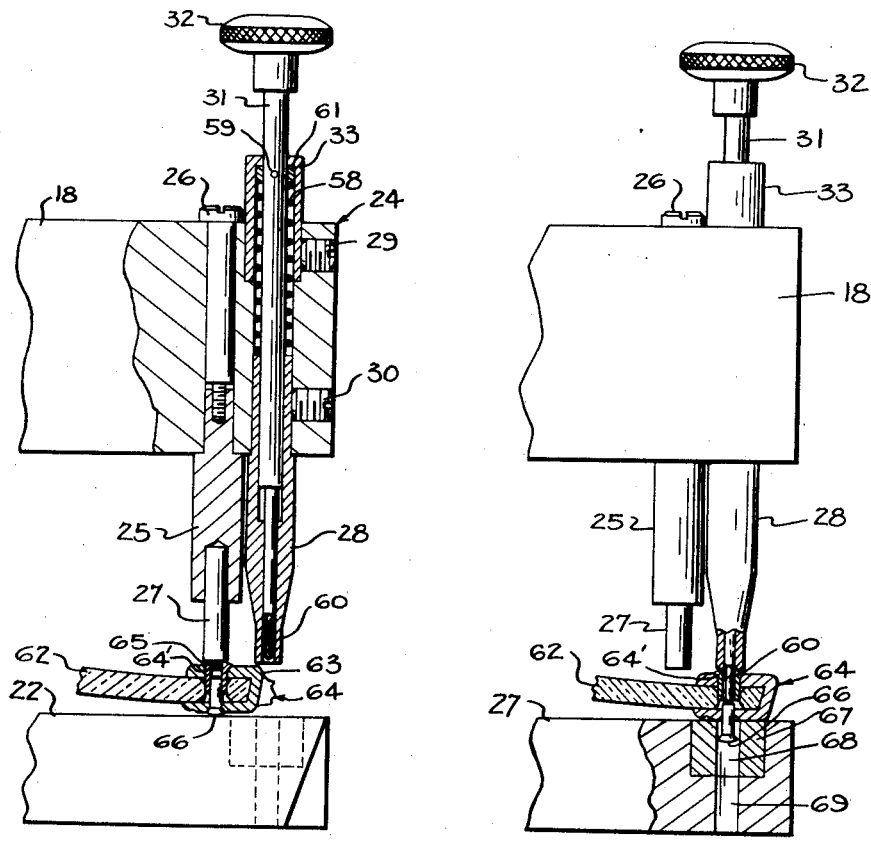
Fig. 7 is a fragmentary sectionalized view of certain of the parts enlarged showing the internal construction of the soldering electrode and the ejector electrodes, with the soldering electrodes in position to heat the parts to be soldered.
Fig. 8 is a view substantially similar to Fig. 7 wherein the ejector operation is in progress.

Heretofore, devices of the general type to which this invention pertains were used for heating interconnecting parts such as with a connecting pin or screw wherein the connecting parts may be of a telescoping type which utilized solder or other suitable moldable material for interconnecting said telescoping members. A typical example of the ophthalmic mounting which utilizes the solder connecting means is shown in Patent No. 2,091,272 issued August 31, 1937, to Charles O. Cozzens.

Machines for assembling ophthalmic mountings utilizing soldered connections of the type set out above in the Cozzens patent, is shown in Patent No. 2,049,101 issued July 28, 1936 to Nelson M. Baker. In the general class to which this invention pertains, of which the hereinbefore mentioned Baker patent is a reasonable example, the switch manipulation was usually an individual operation which a time motion study revealed required additional man hours to accomplish a given amount of production as compared with the results obtained from the present invention.

The critical temperature range of the heating elements for soldering and unsoldering is vitally important since the heat required must properly solder or unsolder the assembly connection without cracking the lens or discoloring the metallic parts of the mounting.

The present invention overcomes these undesirable features and embraces other features and aspects in the invention as more clearly set out in the objects and embodied in the claims.

Referring to the drawings wherein like characters of reference designate like parts throughout the several views the device embodying the invention as shown more particularly in Fig. 1 has a base 10 on which is mounted a transformer 11 secured to the base by screws 12. An inverse time delay circuit breaker or switch 13 is suitably mounted on the base 10 and connected to the transformer by a conductor such as 14. A yoke 15 has pivot studs 16 on either side thereof which are connected on uprights 17, which uprights are fixedly secured to base 10. A master movable electrode 18 is integrally connected with the yoke 15 and the said yoke and master movable electrode are urged downwardly toward the base by the action of the spring 19 which is connected at its top to a cornice member 20 attached to the yoke while the lower end of the spring 19 is attached to a bracket 21, which bracket is connected to the base. The purpose of the spring is to constantly draw the master movable electrode 18 toward the master stationary electrode 22, which stationary electrode is adjustably mounted on the base 10 having insulation portions 23 and 52 separating the master stationary electrode 22 from the base to prevent grounding of said electrode. A head assembly 24 is shown having a soldering electrode 25 which is fixedly connected into the head 24 by means of the screw 26 or other suitable securing means. A resistor electrode 27 is securely fastened into the soldering electrode 25. The resistor electrode 27 may be made of a material having suitable electrical resistance such as stainless steel or Chromel metal. Since electrical resistance increases inversely with the cross section of a conductor, the resistor electrode is reduced in cross section, being smaller than the cross section of the soldering electrode 25 so that the increased resistance caused by the current passing through the resistor electrode will provide a heating area immediately adjacent the ophthalmic mounting, to also provide a suitable contact resistance for the purpose of increased heating bodies immediately adjacent the parts to be heated. While stainless steel and Chromel metal are mentioned specifically, it is to be understood that any suitable metal may be used in the resistor electrode 27 that will provide a contact resistance which is substantially stable to afford a uniform amount of heat.

The head assembly 24 also has an ejector electrode 28 removably mounted therein and held in position by a screw 30. The ejector electrode has a hollow center portion to provide a working space for the ejector stem 31 which has a fingerpiece 32 mounted on the upper portion thereof so that the ejector stem 31 may be moved up and down during the ejection operation. A spring housing 33 is held in place by a screw 29. Screws 29 and 30 permit the spring housing 33 and the ejector electrode 28 respectively to be removed when necessary. The master stationary electrode 22 has an inset 67 therein with a central opening 68 which extends in axial alignment through to the bottom of the master stationary electrode.

A cam lever 36 has a curved portion 37 on one end thereof which acts as a gripping surface for manipulation of the lever while the other end of the camming lever 36 is shaped with a cam surface 38 thereon and is pivotally connected by the screw 39 by means of an upright to the plate 40, which plate is secured to the upwardly extending base portion 41 by means of screws such as 42. The pivotal end of the camming lever 36 has a pin 43 thereon, which pin engages a camming surface 44 formed on the underneath portion of the master electrode 18. A microswitch 45 has an elongated switch lever 46 which extends upwardly to engage the camming surface 38, which camming surface engages the lever 46 to operate the switch contacts of the microswitch 45.

The inverse time delay circuit breaker 13 has a manually operable toggle switch 47 which is shown in the off position. The camming lever 36 shown in its inoperative position is depressing the free end of the lever 46 so that the contacts of the micro-switch 45 are out of engagement with one another causing the micro-switch circuit to be normally open when the camming lever is in its inoperative position.

Referring to Fig. 2 the upright support 17 is shown having the yoke 15 pivotally mounted thereon by use of the pins 16. The camming lever 36 is shown in its normally inoperative position with the pin 43 engaging the rearward portion 48 of the camming surface 44. The master stationary electrode 22 is shown engaging a metallic strip 49 which has a terminal 50 thereon to receive an electrical conductor connected to the transformer output. The insulating portion 23 is provided with a recess between the spaced upright portions 51 to receive the insulating piece 52 which forms the top part of the insulating box of which the part 23 is the bottom and sides thereof (Fig. 1). It will therefore be seen that the master stationary electrode 22 is insulated from all metal except the metallic conductor strip 49 having the terminal 50 thereon. The master stationary electrode is movable within the housing so that axial or lateral adjustment may be provided therein so that the center of the ejector electrode 28 will be substantially in the center of the hole 67 (Fig. 1). The cap 40 is secured to the upright portion 41 to force the insulation portion 52 against the electrode 22 after the proper adjustment has been made thereof.

The views shown in Figs. 3, 4, 5, and 6 are four progressive stages in the forward motion of the camming lever 36 in the direction shown by arrow 53.

Camming lever first position

The pivotal end of the camming lever 36 has been explained as being pivotally connected to the cap 40 and is shown more clearly in Figs. 2 to 6 as being pivotally connected to the cap 40 by means of the upright 54 secured to the cap 40. The micro-switch lever extension 46 is shown depressing the pin 55 which holds the contacts inside the micro-switch 45 in a normally open position. The camming surface 38 is engaging the free end portion of the micro-switch lever 46 holding said switch open. The pin 43 is in its extremely rearward position engaging the back stop or camming surface 48 of the major camming surface 44. In Fig. 3 it is pointed out that the extreme rearward position of the camming lever 36 causes the micro-switch to be depressed having its contacts open while the master movable electrode 18 is elevated.

Camming lever second position

In Fig. 4 the camming lever has been moved to its second position and simulates the relative position of the respective parts when the master movable electrode has reached the camming shoulder 56 so that the master electrode 18 now is lowered so that the ophthalmic mounting assembly is gripped between the master stationary electrode and the master movable electrode pin 27 respectively under action of the spring 19. The micro-switch 45 still has its extension lever 46 depressed by its camming surface 38 so that the micro-switch is still open.

Camming lever third position

In the representation shown in Fig. 5 the various parts indicate that the camming lever has been moved to its third position, that is, it is now shown with the pin 43 moved away from the shoulder 56 where the pin 43 no longer supports the master movable electrode. The downward force of the master electrode 18 under the action of the spring 19 is now exerted upon the ophthalmic mounting assembly between the electrodes so that the pin 43 on the camming lever 36 is free to continue its forward movement. At this point in the third position, the micro-switch 45 is shown as having the pin 55 under less tension by the micro-switch lever 46 under action of the camming surface 38. While the expression micro-switch is understood by those skilled in the art, it is pointed out here that a movement of the lever 46 away from the micro-switch base for a distance of from 0.001 to 0.003 of an inch is sufficient to insure the proper making of the circuit by contact closure in the micro-switch 45. While it is difficult to show this relative movement in conjunction with the small parts with which we are concerned, it is to be understood that the exaggerated drawing of the micro-switch lever 46 in Fig. 5 is representative of sufficient movement to indicate that the micro-switch has been moved from an open to a closed position by action of the camming lever 36.

Camming lever fourth position

The representation shown in Fig. 6 indicates the fourth position of the camming lever, that is, that the extreme forward position of the camming lever has now been reached and the camming surface 57 now engages the upper surface of the plate 40. Since the upright 54 is secured to the plate 40 by means of the pin 39, the distance between the center of the pin 39 and plate 40 is insufficient to pass the camming surface 57 due to action of the forward motion of the camming lever 36 so that the upper surface of the plate 40 and the camming surface 57 act as stops to restrict the forward movement of the camming lever 18.

The view shown in Fig. 10 is a modification of the movable electrode stop means to prevent the movable electrode 18 from ever having its electrodes per se such as members 27 and 28 from engaging the stationary electrode 22. The stop arm 85 is positioned so as to engage the screw 39 just before the electrodes would ordinarily engage the stationary electrode 22 if a stop means was not employed. Either or both of the stop means as shown in Figs. 2 or 11 may be used satisfactorily.

Summary of camming lever positions

Summarily, the micro-switch is open in positions 1 and 2, while said micro-switch is closed in positions 3 and 4. Position 1 is the normally inoperative position when the master movable electrode 18 is in its extreme elevated position to permit the ophthalmic mounting to be placed on the master stationary electrode 22. This position represents the greatest elevation of the master movable electrode wherein the greatest distance between the master movable electrode and the master stationary electrode is reached and is referred to as the maximum spacing of the electrodes. The minimum spacing of the electrodes under proper operative conditions for effective manipulation of the micro-switch, is the distance between the electrodes that properly engages the ophthalmic mounting any time before the micro-switch closes. The device is so constructed in conjunction with its camming surfaces that for all ophthalmic mountings in use today the minimum spacing between the electrodes is sufficient to properly grip the ophthalmic mounting under action of the spring 19 to hold said mounting securely before the micro-switch is closed. Any further movement of the camming lever 36 after the micro-switch is closed may normally be referred to as the fourth position and is specifically attained by engagement of the camming surface 57 on the upper surface of the plate 40. The fourth position as shown in Fig. 6 may be referred to as the extreme forward position of the camming lever 36. It will therefore be seen that the simple swing of the camming lever 36 from position 1 to position 4 inclusive will cause the electrodes to move from the maximum to the minimum position and thereafter close the micro-switch contacts and permit the camming lever to come to rest by action of the stop members provided in the camming surface 57 and the plate 40.

Soldering and ejector head assembly

The soldering and ejector head assembly shown in Fig. 7 has a portion of the ophthalmic mounting inserted between the resistor electrode 27 and the upper surface of the master stationary electrode 22. The free end of the portion 18 which terminates in the assembly head has a metallic soldering electrode 25 which fits into an opening communicating with the screw 26 which is threadedly connected to the upper end of the soldering electrode to hold said electrode firmly within the head assembly to insure good electrical connection therebetween. The resistor electrode 27 is usually driven or suitably forced into an opening in the lower portion of the soldering electrode. While the term soldering electrode has been used, it is to designate the electrode which conducts energy for the soldering operation in contradistinction to the electrode which supports the ejector pin 60 in the ejector electrode 28. It will be seen from the drawings that the resistor electrode 27 is actually the electrode which engages the ophthalmic mounting per se. The ejector electrode 28 is suitably fitted into the head assembly and is removably held in place by a screw 30. A spring housing 33 is removably held in place by an adjusting screw 29. The ejector stem 31 has a fingerpiece 32 on one end thereof and an ejector pin 60 on the opposite end thereof. A washer 61 is secured to the ejector stem 31 by means of a pin 59 while a spring 58 is compressed between the washer 61 and the upper edge of the ejector electrode 28 so that while the ejector electrode 28 remains stationary in relation to the master removable electrode 18, the ejector stem may be moved downwardly by pressure on the fingerpiece 32 so that the ejector pin 60 may be moved into a position substantially as shown in Fig. 8.

A perforated lens 62 is adapted to receive a perforated lens strap or temple support such as 63, as the case may be, which utilizes a tubular member 64' having a slug of solder 65 in one end thereof, while the opposite end of the tubular member 64', is adapted to receive a pin 66. Both the tubular member and the pin have heads thereon which prevent said pieces from moving beyond a certain point of the lens strap or temple support 63.

The view shown in Fig. 7 has resulted from the camming lever moving to the second position so that the resistor electrode 27 and the master stationary electrode 22 securely grip the ophthalmic mounting 64. When current is supplied to the engaging electrodes, the hot resistor electrode 27 aided by the contact resistance between the resistor electrode and the ophthalmic mounting will cause the slug of solder 65 to melt and flow around the pin 66 so that when the solder cools, it will harden and adhere to the tubular and pin members integrally uniting same. The tubular member and pin member may be treated with a suitable flux to increase the adhering action of the solder.

In the event it should be necessary or desirable to unsolder the tubular and pin members, the ejector electrode is used as shown in Fig. 8.

The enlarged view of the head assembly shown in Fig. 8 shows the ophthalmic mounting 64 moved under the ejector electrode. A tubular inset 67 has an opening 68 therein which communicates with an opening 69 in the lower portion of the master stationary electrode 22, which opening permits the passage of the pin 66 through both of said openings 68 and 69 so that the pin 66 may fall into a small container which may be located below the master stationary electrode. The tubular inset 67 is located under the ejector electrode so that the electrical contact resistance between the lower portion of the ophthalmic mounting and the tubular inset 67 will be adequate to provide plenty of heat for the unsoldering operation. It may be pointed out here that the resistor electrode is used to provide a uniform quantity and quality of heat while the unsoldering or ejector operation is concerned primarily with the quantity of heat rather than the quality though it is understood that the heating for the ejection operation must not be so great as to cause discoloration of the precious metal or the cracking of the lens.

The tubular inset 67 has an opening 68 therein, which opening is slightly larger than the head of the pin 66 so that when the tubular inset 67 and the ejector electrode 28 are properly vertically aligned, the downward pressure on the fingerpiece 32 will cause the ejector pin 60 to engage the ophthalmic mounting pin 66 so that it is free of the ophthalmic mounting, it being understood that sufficient heat has been provided to melt the solder and free the pin 66 for the ejection operation. The purpose of the hole 69 is to permit the pin 66 to drop therethrough when it is free from the ophthalmic mounting, while the hole 68 in the tubular inset 67 is used for centering the pin and tubular assembly directly in line with the ejector pin so that straight up and down movement of the ejector pin will not have any side strain which may result in a bent ejector pin, or sometimes may result in jamming of the ophthalmic mounting pin 66 in the ophthalmic mounting and/or the tubular inset 67 which may result in difficulty in thereafter removing the pin.

The electrical circuit

Figure 9:
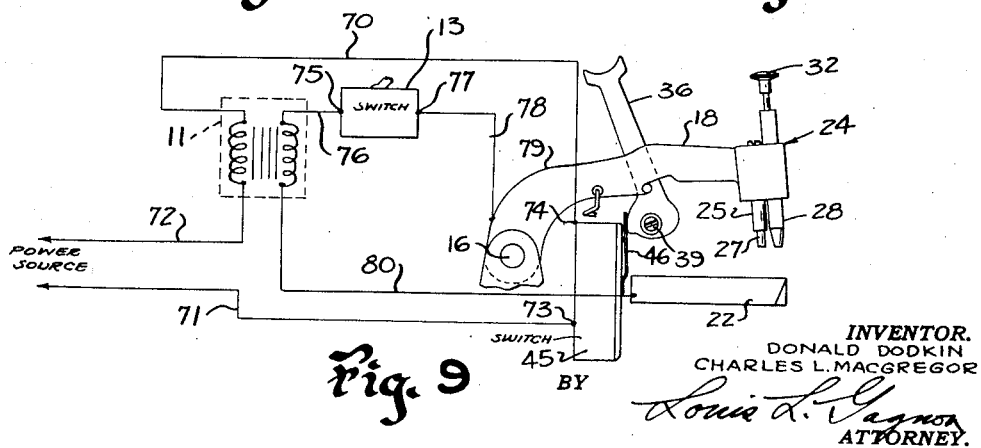
Fig. 9 is a diagrammatical representation of the electrical circuit used in the invention.

The electrical circuit shown in Fig. 9 has one side of the power source connected to one side of the transformer by means of conductor 72 while the other side of the power source is connected to one side of the micro-switch 45 at terminal 73 by means of conductor 71. The opposing side of the transformer input is connected to terminal 74 of the micro-switch by means of the conductor 70. The output of the transformer 11 is connected to one side of the inverse time-delay switch 13 at terminal 75 by means of conductor 76. The opposing side of the inverse time-delay switch is connected from terminal 77 through conductors 78, yoke 79, master movable electrode 18, assembly head 24, soldering electrode 25, and resistor electrode 27. When the ophthalmic mounting is on the member 22 the circuit is completed from the resistor electrode 27 through the master stationary electrode 22, conductor 80 back to the opposing side of the output side of the transformer 11. The camming lever 36 is shown in its normally inoperative position. When the ophthalmic mounting is moved to the ejector position, the circuit will be the same as before except that the current will flow from the ejector electrode 28 through the ophthalmic mounting to the master stationary electrode 22.

The manually operable toggle or tumbler switch 13 is a time-delay relay or circuit breaker of the inverse type, preferably, so that the rate of energy and time are both considered as important elements to provide the desired heat in both the soldering and ejection operation. The micro-switch may be of any suitable type that may be operated to close its contacts and complete the input circuit when the camming lever 36 reaches its third position.

In normal operation, the camming lever is in its inoperative position. The inverse time-delay relay or circuit breaker is then thrown or moved into the "on" position which prepares the output circuit for energization when the electrode ejector contacts engage the ophthalmic mounting supported suitably on the master stationary electrode. A micro-switch is of a suitable type to close the primary circuit after the soldering or ejector electrodes suitably engage the opthalmic mounting positioned on the master stationary electrode.

While in normal operation the inverse time-delay relay is generally closed first, it is to be understood that either the micro-switch or the inverse time-delay switch may be closed first, since sequence is not entirely important. The important thing is that the soldering or ejection electrodes securely contact the ophthalmic mounting before the electrical circuit is completely energized.

The micro-switch has been specifically shown as being in the input transformer circuit but it is to be understood that this could be in the output circuit. While the diagram in Fig. 9 shows only a specific illustration, it is to be understood that the placement of the switch in a particular circuit part, is purely incidental to the normal operation of the circuit provided the desired results are obtainable.

The wiring diagram set out herein shows that there is a transformer for each of the electrical circuits of the present invention. When devices of this type are used in gang formation by one or more operators, a source of energy may be connected directly to the inverse time-delay relay and/or micro-switch without the use of a transformer for each machine. Likewise a single transformer may be used with the output being connected to several machines in parallel. It is therefore specifically set out that the inclusion of the transformer is essential where the voltage must be changed to meet the requirements of the machine, but the machine circuits may be varied within reason to meet other conditions without departing from the spirit of the claims presented herewith.

In commercial practice, the method and means employed may involve changes from the specific disclosure set forth herein and minor changes may readily suggest themselves. The right to make certain minor departures from the specification and drawings is retained and equivalent parts may be used within the spirit of the invention as defined by the subjoined claims.

Having described our invention, we claim:

1. In a device of the class described having a supporting structure, a stationary arm comprising an electrode secured to said supporting structure, a metallic inset having an aperture therein disposed adjacent the free end of the stationary arm, a movable arm pivotally connected to said supporting structure, an electrode adjacent the free end of said movable arm being axially aligned with the aperture in the stationary arm inset, a lug carried by said supporting structure, a lever connected to said lug and having a stop pin thereon, and a camming surface on said movable arm for engaging the stop pin on said lever, said camming surface having a back stop portion and a camming shoulder, whereby movement of the lever to its operative position will align the movable arm electrode with the aperture in the stationary arm inset.

2. A heating device of the character described comprising the combination of a base having a pair of electrodes thereon for engaging work to be heated, one of said electrodes being pivotally supported for movement toward the other and having an abutment surface thereon, a hand lever pivotally supported adjacent the pivoted electrode having a member for engaging the abutment surface of said electrode, said abutment surface and member for engaging said surface being so related as to control the movement of the pivoted electrode toward the other electrode when the hand lever is operated, a switch on said base adjacent the electrodes, a transformer supported by said base and having input and output means, conductor means connecting one side of the transformer input with a source of electrical energy, conductor means connecting the source of electrical energy with one side of the switch, conductor means connecting the other side of the switch with the other side of the input of the transformer, conductor means connecting one side of the output means of the transformer with one of the electrodes, a time-delay relay of the inverse type, conductor means connecting the other side of the output means of the transformer with one side of the time-delay relay, conductor means connecting the other side of said time-delay relay to the other of said electrodes and cam means on said hand lever adjacent the pivoted end thereof controlled as to shape so that when the said lever is operated in the direction for moving the pivoted electrode towards the other of said electrodes, the said cam means will operate the switch to close the circuit to the source of electrical energy thereby energizing the output of the transformer, the time-delay relay and the electrodes only after the pivoted electrode has engaged the work, with the time-delay relay functioning to regulate the amount of heat generated in the work.

3. A heating device of the character described comprising the combination of a base having a pair of electrodes thereon for engaging work to be heated, one of said electrodes being pivotally supported for movement toward the other and having a cam surface thereon, a hand lever pivotally supported adjacent the pivoted electrode having a member for engaging the cam surface of said electrode, said cam surface being so shaped as to control the movement of the pivoted electrode toward the other electrode when the hand lever is operated, a switch on said base adjacent the electrodes having connection terminals, a transformer supported by said base and having input and output means with connection terminals, conductor means connecting one terminal of the transformer input with a source of electrical energy, conductor means connecting the source of electrical energy with one terminal of the switch, conductor means connecting the other terminal of the switch with the other terminal of the input of the transformer, conductor means connecting one terminal of the output means of the transformer with one of the electrodes, a time-delay relay of the inverse type having connection terminals, conductor means connecting the other terminal of the output means of the transformer with one terminal of the time-delay relay, conductor means connecting the other terminal of said time-delay relay to the other of said electrodes and cam means on said hand lever adjacent the pivoted end thereof controlled as to shape so that when the said lever is operated in the direction for moving the pivoted electrode towards the other of said electrodes the said cam means will operate the switch to close the circuit to the source of electrical energy thereby energizing the output of the transformer, the time-delay relay and the electrodes only after the pivoted electrode has engaged the work, with the time-delay relay functioning to regulate the amount of heat generated in the work.

DONALD DODKIN.
CHARLES L. MacGREGOR.